United States Patent
Courtier et al.

(10) Patent No.: US 12,030,616 B2
(45) Date of Patent: Jul. 9, 2024

(54) COMPOSITE BLADE FOR A TURBINE ENGINE ROTOR

(71) Applicant: SAFRAN AIRCRAFT ENGINES, Paris (FR)

(72) Inventors: Vivien Mickael Courtier, Moissy-Cramayel (FR); Anthony Binder, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/904,076

(22) PCT Filed: Feb. 12, 2021

(86) PCT No.: PCT/FR2021/050258
§ 371 (c)(1),
(2) Date: Aug. 11, 2022

(87) PCT Pub. No.: WO2021/165604
PCT Pub. Date: Aug. 26, 2021

(65) Prior Publication Data
US 2023/0081843 A1    Mar. 16, 2023

(30) Foreign Application Priority Data
Feb. 18, 2020  (FR) ...................................... 2001593

(51) Int. Cl.
*B64C 11/26*      (2006.01)
*B64C 27/473*     (2006.01)
(Continued)

(52) U.S. Cl.
CPC ............ *B64C 11/26* (2013.01); *B64C 27/473* (2013.01); *F01D 5/282* (2013.01); *F01D 5/30* (2013.01);
(Continued)

(58) Field of Classification Search
CPC ......... B64C 11/20; B64C 11/24; B64C 11/26; B64C 27/473; F01D 5/30; F01D 5/147; F01D 5/282
See application file for complete search history.

(56) References Cited

U.S. PATENT DOCUMENTS 2,511,862 A * 6/1950 Martin ................... B64C 11/24
                                                              29/889.61
3,923,421 A   12/1975 Carter et al.
(Continued)

FOREIGN PATENT DOCUMENTS

EP    0610273 A1   8/1994
EP    2679487 A2   1/2014
(Continued)

OTHER PUBLICATIONS

International Search Report received for PCT Patent Application No. PCT/FR2021/050258, mailed on Apr. 30, 2021, 6 pages (2 pages of English Translation and 4 pages of Original Document).
(Continued)

*Primary Examiner* — J. Todd Newton
*Assistant Examiner* — Cameron A Corday
(74) *Attorney, Agent, or Firm* — WOMBLE BOND DICKINSON (US) LLP

(57) ABSTRACT

The invention relates to a composite blade (5) for a turbine engine rotor, for example, an unducted propeller, comprising a skin (6) made of woven fibres forming the outer profile of the blade and an attachment (11) with cylindrical geometry in the direction of the span emerging from the blade root (9), which attachment is intended to retain the blade (5) on a hub of the rotor, characterised in that it further comprises a spar (16) having a hollow tube structure made of braided carbon fibres, fixed to the attachment (11) and extending inside the skin (6) over at least part of the span of the blade (5). The
(Continued)

invention also relates to a propeller comprising said blade and to a method for manufacturing said blade.

18 Claims, 3 Drawing Sheets

(51) Int. Cl.
F01D 5/28 (2006.01)
F01D 5/30 (2006.01)

(52) U.S. Cl.
CPC ...... B64C 2027/4736 (2013.01); F05D 2220/323 (2013.01); F05D 2230/20 (2013.01); F05D 2240/30 (2013.01); F05D 2300/6034 (2013.01)

(56) References Cited

U.S. PATENT DOCUMENTS

| | | | | |
|---|---|---|---|---|
| 4,789,304 A | * | 12/1988 | Gustafson | F01D 5/288 |
| | | | | 428/117 |
| 5,127,802 A | * | 7/1992 | Carlson | B29C 44/18 |
| | | | | 29/889.71 |
| 5,222,297 A | * | 6/1993 | Graff | B29C 70/865 |
| | | | | 29/889.7 |
| 9,410,434 B2 | * | 8/2016 | Petellaz | B64C 11/26 |
| 9,488,056 B2 | * | 11/2016 | Nagle | B64C 11/26 |
| 10,239,604 B2 | * | 3/2019 | Foskey | B64C 11/24 |
| 2013/0017093 A1 | | 1/2013 | Coupe et al. | |
| 2013/0343898 A1 | * | 12/2013 | Folsom | B64C 11/22 |
| | | | | 29/889.71 |
| 2014/0112796 A1 | * | 4/2014 | Kray | F04D 29/324 |
| | | | | 416/226 |
| 2015/0147169 A1 | * | 5/2015 | Miller | F01D 9/02 |
| | | | | 415/208.1 |
| 2017/0355446 A1 | * | 12/2017 | Andrzejewski | F16C 33/62 |
| 2019/0315451 A1 | * | 10/2019 | Seminel | B29C 70/48 |
| 2019/0323357 A1 | * | 10/2019 | Courtier | D03D 15/573 |

FOREIGN PATENT DOCUMENTS

| | | |
|---|---|---|
| FR | 2954271 A1 | 6/2011 |
| WO | 93/08017 A1 | 4/1993 |

OTHER PUBLICATIONS

Wikipedia, "Kevlar", Retreived from <https://web.archive.org/web/20190331041012/https://fr.wikipedia.org/wiki/Kevlar>, Mar. 31, 2019, 3 pages.

* cited by examiner

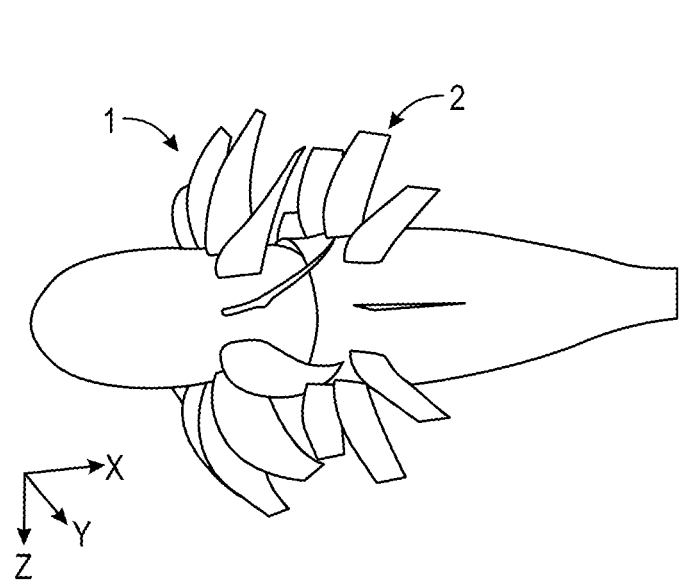
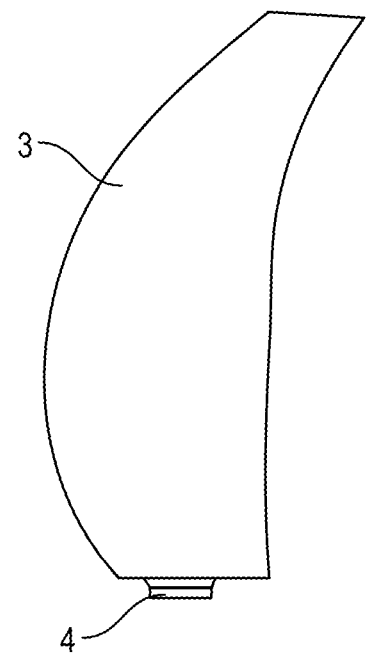
FIG. 1  FIG. 2
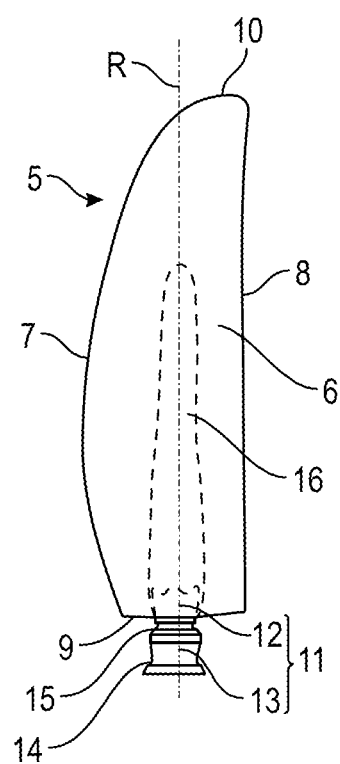
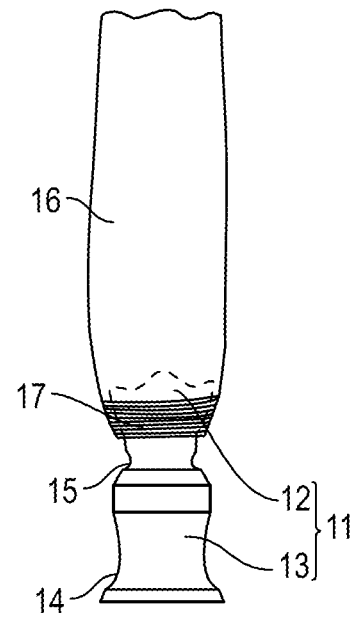
FIG. 3  FIG. 4

COMPOSITE BLADE FOR A TURBINE ENGINE ROTOR

TECHNICAL FIELD OF THE INVENTION

The invention relates to a rotor blade for a turbine engine. It concerns more particularly the un-ducted propellers for turbine engine architectures such as those of the Open Rotor type (i.e., with un-ducted fan). The open rotor architectures comprise the CROR (Counter Rotative Open Rotor with two rows of counter-rotating propellers), the USF (Unducted Single Fan) or the turboprop engines.

TECHNICAL BACKGROUND

The prior art comprises, in particular, the documents EP-B1-0610273, EP-A2-2679487, U.S. Pat. No. 3,923,421 and FR-A1-2954271.

According to a typical architecture, illustrated in FIG. 1, an Open Rotor Turbine engine, more precisely USF, may comprise a single propeller 1 upstream of a stationary stator vane 2 downstream. The engine of the turbine engine driving the propeller is inside the fairing carrying the stator vane 2. The blades of the propeller 1 are generally variable pitch, i.e. they rotate around a radial axis on the hub of the propeller, and their attachment to the hub must be designed for this.

The detailed design of such a blade involves several disciplines with generally conflicting objectives. The design must allow for optimal aerodynamic performance, i.e. provide the thrust with minimal losses for different flight conditions, while ensuring the mechanical strength of the vane for a minimum mass and limiting the acoustic signature of the vane.

The improved aerodynamic performance on the propeller tends to increase the ratio of moved airflow to flow passing through the engine, which translates into an increase in the external diameter, and therefore the span of the blades.

In the Open Rotor and USF architectures, the blades of the propellers therefore transmit a very high torque to the hub of the propeller. In addition, the aerodynamic optimisation of the blades and the acoustic considerations lead to the design of thin blades with changes in profile and pitch along their span.

Furthermore, the un-ducted propellers are subjected to forces that can vary greatly in intensity depending on the flight conditions and can also fluctuate violently under certain conditions.

In addition, in un-ducted architectures, the aerodynamic flows through the blades are strongly impacted by the effects of installation of the engine on the aircraft as well as the general upstream flow direction, e.g. an incidence with respect to the wind. This results in, for example:

distortions due to the installation of the engine because, without the fairing, the engine is influenced by the ground and the surrounding fuselage, which causes a dissymmetry of speed in the feed of the propeller according to the engine azimuths. This results in a vibratory response on the first engine orders according to the spatial Fourier series decomposition of the distortion on the circumference; and An increased sensitivity to crosswind or aircraft incidence, when climbing or approaching phases of the aircraft, as without the fairing, the direction of the flow through the blades is not parallel to the engine axis. This skid angle induces a vibratory response on the first engine order.

In addition, on the Open Rotor, USF and turboprop engine architectures, in accordance with the prior art for the propellers, the start-up of the engine is performed at a very open pitch. Indeed, a very open pitch (referred to as feathering) allows to consume the power by the torque which ensures the machine safety by guaranteeing low propeller speeds (rotation speeds). More precisely, according to simple considerations, the power is proportional to the product of the speed and the torque; and this torque increases with the incidence (thus with the pitch according to the propeller plane reference). The aerodynamic forces increase as the incidence increases, as this increases the deflection of the flow that the profile tends to generate. Furthermore, the person skilled in the art in aerodynamics understands that the resulting force on a blade profile is almost perpendicular to the direction of incidence for a very open pitch. Most of the resulting force is directed in the propeller plane, the thrust generated by the propeller is zero, the torque is maximum and the speed is minimum.

On the other hand, with a very open pitch, the incidence is so large that the blades undergo a turbulent, fully unstuck aerodynamic flow that generates a broadband vibration excitation. Especially on large chord and span blades, the bending force is intense, although the speed is not high.

However, according to the prior art for the turbine engine architectures mentioned above, the blades 3 are attached by a pinned attachment 4, elongated along the chord of the blade at the level of its root, as illustrated in FIG. 2. This solution allows the forces to be taken up over a large length of attachment and to adapt to a thin composite propeller blade 3, suitable for the turbine engines covered by the invention.

However, the pinned attachment does not currently appear to be a viable solution for large chord and span propeller blades.

The object of the invention is to propose a solution to obtain a composite blade suitable for Open Rotor, USF and turboprop engine architectures, with a root attachment that is sufficiently rigid to bear the broadband vibratory stresses caused by fully lifted aerodynamics, as well as the vibrations caused by distortions due to the installation of the engine or by the forces due to the angle of incidence of the upstream flow.

SUMMARY OF THE INVENTION

To this end, the invention relates to a composite blade for a turbine engine rotor, for example, an un-ducted propeller, comprising a skin made of woven fibres forming the external profile of the blade and an attachment with cylindrical geometry in the direction of the span emerging from a blade root, which attachment is intended to hold the blade on a hub of said rotor, characterised in that it furthermore comprises a spar having a hollow tube structure made of braided carbon fibres, fixed to the attachment and extending inside the skin over at least one portion of the span of the blade.

Preferably, the spar extends over a distance of between 30% and 70% of the span from the blade root. The span of the blade is understood here as the distance between the blade root at the level of the leading edge of the blade and the head of the blade at the level of the leading edge.

A cylindrical root attachment can be sized to bear the broadband vibration stresses caused by a fully lifted aerodynamics and the vibrations caused by distortion (installation effect), as well as the forces due to the angle of incidence and wind skid. However, in order for the assembly to be sufficiently rigid, the installation of such an attachment according to the prior art results in a blade architecture with thick profiles over the entire span of the blade. The braided fibre spar provides a rigid structure linked to the attachment which takes up the forces over a portion of the blade span to provide sufficient rigidity to the assembly. In addition, the braided fibre structure of the spar is malleable at the time of manufacture, so that it can be flattened away from the root to make a propeller blade with thin profiles over the majority of the span, compatible with the design of a turbine engine propeller of the Open Rotor type, for example.

Advantageously, the attachment comprises a bell-shaped portion inserted at one end of the spar. Preferably, a coiling of glass fibre surrounds said end of the spar so as to immobilize the latter around the bell-shaped portion.

The insertion of the bell into the hollow tube of the spar allows the lateral forces to be taken up over a sufficient distance. In addition, the bell shape and the fibreglass coiling ensure that the spar is retained against centrifugal forces. Under centrifugal force, the glass fibres operate in traction due to the flared shape of the bell. Although the spar is preferably inserted tightly around the bell-shaped portion, the fibreglass coiling secures the connection between the spar and the attachment.

Preferably, the attachment is made of metallic material, even more preferably martensitic steel.

This type of material allows for a sufficiently rigid attachment with a diameter that is not too large to limit the thickness at the blade root. In addition, this material allows the mechanical connecting elements to be made with a rotation system on the hub to modify the pitch of the blade, for integration into a variable pitch propeller.

Thus, the attachment advantageously comprises at least one reinforcement intended to form a ring for a ball rolling allowing the blade to pivot about an axis parallel to its span with respect to the hub.

Preferably, a foam shape ensures the interface between the spar and the skin.

This foam shape allows the blade to be shaped and ensures that the skin is held in place against the grubbing by centrifugal force.

Preferably, the interior of the spar is filled with a foam shape.

The foam shape allows the shape of the hollow spar to be matched to the overall shape of the blade, both in terms of pitch and thickness, as the foam shape can be tapered and the spar can be flattened around this shape during manufacture, to ensure the thinness of the profile of the blade.

The blade may comprise a monolithic portion of woven skin at its head, without spar or foam inserted.

This allows to obtain very tapered blade ends, the spar having fulfilled its structural function on the portion of the blade closer to the root.

The invention also relates to a turbine engine propeller comprising blades as described above.

The invention also relates to a method for manufacturing a blade as described above, comprising the weaving of a preform for the skin, characterised in that it comprises a step of manufacturing an assembly comprising a braided preform of hollow spar and a cylindrical attachment fixed together, a step of inserting said assembly into the skin preform, and a step of forming the blade with its final shape by a resin transfer molding method, referred to as RTM.

It is therefore the production of the spar and attachment assembly that allows to give the blade its rigidity while absorbing the vibrations at the blade root. The resin transfer moulding method, with its polymerisation phase, allows the different elements of the blade to be joined together.

Advantageously, the weaving of the preform of the skin is done with a method of interweaving warp strands with weft strands with the creation of an unbinding on a portion of the skin, arranged to insert the assembly comprising the braided spar preform and the attachment.

Preferably, the unbinding is done at the trailing edge, which does not weaken the structure of the final blade, while allowing the insertion of the spar to be well controlled, inside a possible foam shape that follows the inner outlines of the woven skin.

Preferably, a foam shape is inserted into the braided preform of the spar, when it is assembled with the attachment, in order to make it conform to the final shape of the profile of the blade.

BRIEF DESCRIPTION OF THE FIGURES

Further characteristics and advantages of the invention will become apparent from the following detailed description, for the understanding of which reference is made to the annexed drawings in which:

FIG. 1 is a schematic perspective view of a turbine engine of the Open Rotor type concerned by the invention;

FIG. 2 is a schematic side view of a blade according to the prior art for the propeller of the turbine engine of FIG. 1;

FIG. 3 is a schematic side view of a blade according to the invention for the propeller of the turbine engine of FIG. 1;

FIG. 4 is a schematic side view of the spar inserted into the blade in FIG. 3 with its attachment to the root of the blade;

DETAILED DESCRIPTION OF THE INVENTION

Figure 5A:
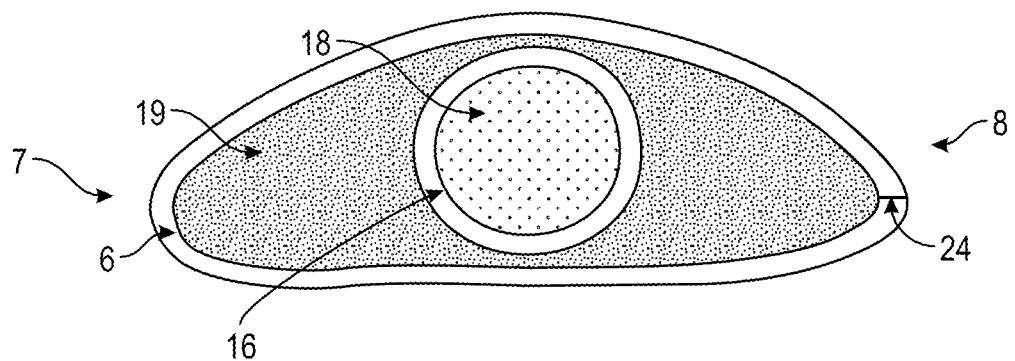
FIG. 5*a* is a schematic cross-sectional view of the blade of FIG. 3 near the root (section along line A in FIG. 6)

With reference to FIG. 3, a composite propeller blade 5 according to the invention comprises a woven skin 6, here made of carbon fibres, which forms the aerodynamic surface of the blade 5, in contact with the air moved by the propeller. The skin 6 forms an intrados face and an extrados face of the blade 5 connecting to the leading edge 7 and to the trailing edge 8. The weaving of the skin 8 comprises warp strands, oriented longitudinally from the root 9 towards the head 10, and weft strands, oriented transversely along the chord of the blade 5. A good path of the weft strands is ensured by means of an interlocking method, in particular at the level of the leading edge 7, to ensure a good link between the extrados and intrados portions of the skin 8 at this level. Further characteristics of the weaving of the skin 6 are described later in the description of the method of manufacturing the blade 5.

The profile of the blade 5 is relatively thick at the level of the root 9 and becomes thinner along the span towards the head 10 of the blade. The blade 5 in the example has almost no deflection, but other examples may have positive or negative deflections. Furthermore, the blade 5 is shown here in radial projection, but it may have a tilt and a twist about the radial axis, which are not shown in the figure.

According to the invention, an attachment 11, also referred to as root, of cylindrical shape around a radial axis R is inserted partly between the extrados and intrados faces of the woven skin 6, at the root 9 of the blade 5. The portion 12 of the attachment 11 inserted between the two faces of the skin 6 is bell-shaped, flaring out in the direction of the head 10 of the blade 5. A second portion 13, outside the blade profile defined by the woven skin 6, is shaped to mount the blade 5 in a propeller hub and allow the blade to be rotated about the radial axis R, to vary the pitch. Here, the second portion 13 of the attachment 11 is designed to be mounted on a device with two rolling lines and to act as an inner ring. Schematically, a recess 14 at the bottom of the attachment 11 is intended for the inner ring of a first row of balls (large rolling which absorbs the centrifugal forces) and a recess 15 near the bell-shaped portion 12 is intended for the inner ring of a second row of balls (small rolling which absorbs aerodynamic forces).

It is possible to reverse this device by positioning the rolling taken up the radial forces above and a rolling taken up the secondary forces below. This choice can be proposed for integration constraints.

The attachment 11 is made of a metallic material, preferably martensitic steel, to take up the forces between the blade 5 and the hub of the propeller.

Figure 5B:
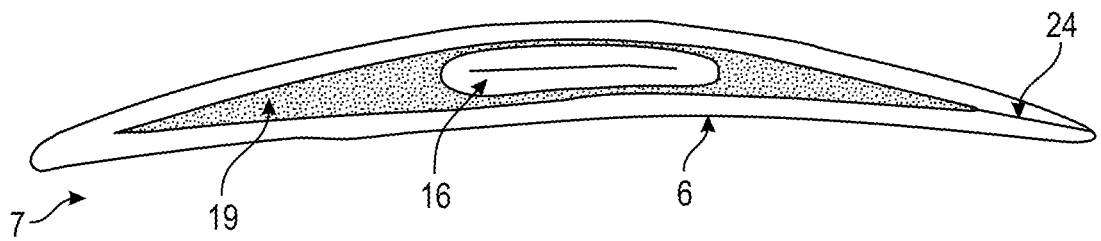
FIG. 5*b* is a schematic cross-sectional view of the blade of FIG. 3 in the body of the blade away from the root (section along line B in FIG. 6)

Also, according to the invention, a spar 16 attached to the bell portion 12 of the attachment 11 extends over a large portion of the span of the blade 5 between the intrados and extrados faces of the skin 6. In the example shown, it extends to about two-thirds of the span. Depending on the design choices, the length of the spar 16 will preferably be between 30% and 70% of the span of the blade 5, with 0% corresponding to the radius of the blade root at the level of the leading edge 9 of the blade and 100% corresponding to the radius of the head 10 at the level of the leading edge. This spar 16 is a hollow tube made of braided carbon fibre. As shown in FIGS. 5A and 5B, it has an almost circular cross-section at the level of the root 9 of the blade 5, where the thickness of the profile allows, and its cross-section gradually flattens out to arrive in the areas where the profile of the blade 5 is thin, in the body of the blade 5.

With reference to FIG. 4, the spar 16 is inserted around the bell portion 12 of the attachment 11 and is here strapped around the latter by a fibreglass coiling 17. This strapping allows to retain the blading against centrifugal force. The glass fibre is an example here, the coiling must be made with a fibre that the person skilled in the art will choose according to the mechanical constraints present.

Figure 6:
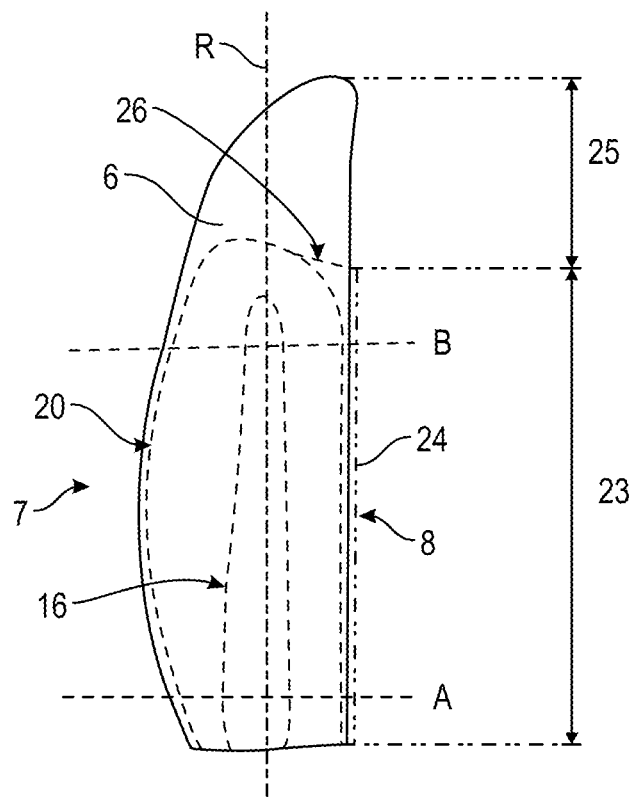
FIG. 6 is a schematic side view of the blade in FIG. 3 showing its internal structure.

Furthermore, with reference to FIG. 5A, a foam shape 18 here fills the interior of the spar 16. Similarly, a foam 19 fills the space between the spar and the skin of the blade. In FIG. 6, this free volume filled with foam 19 is represented within its limits in the longitudinal and transverse directions by the dotted line 20.

The assembly is injected with resin and polymerised to obtain its mechanical strength by a known method of resin transfer moulding (RTM). Further characteristics of the blade 5 are described in the following description of the manufacturing method for the blade, which uses the RTM method.

In a step prior to the method itself, the metallic material attachment 11, with its bell portion 12, can be machined by conventional methods.

The method then comprises two steps that can be performed in parallel.

The first of these two steps concerns the assembly of the preform of the spar 16 with the attachment 11.

It comprises the braiding of the preform for the spar 16, which is made with carbon fibres on an industrial braiding machine. The preform is a hollow tube open at both ends. The cross-section of the tube may be circular with a variable diameter, in particular to subsequently adapt the cross-section of the spar 16 to the variations in the thickness of the profile of the blade 5 along the span.

The preform of the spar 16 is then assembled with the bell portion 12 of the attachment. The assembly of the braided preform with the bell portion 12 is done by inserting the bell portion 12 into the preform of the spar 16 and then making a coiling 17 of glass fibre which has been described previously. These operations are preferably performed around a very cold bell portion 12 by forcing the bell portion 12 into the preform of the spar 16.

A previously machined foam part 18 can then be inserted into the preform of the spar 16. The function of this foam part 18 is to fill the cavity left empty inside the braided preform of the spar and to guarantee the final shape of the spar 16 during the shaping of the blade 5. Note that the foam shape 18 may be non-cylindrical. In this case, the preform of the spar 16 can be crushed in the portions of the vane where the profile is thin, as described above. The foam part 18 may stop before the free end of the preform of the spar 16.

At the end of this step, a secured assembly is obtained comprising the attachment 11 and the preform of the spar 16, integrating the foam shape 18 that the spar will surround in the blade.

The second of the first steps comprises the weaving of the woven preform for the skin 6.

Figure 7:
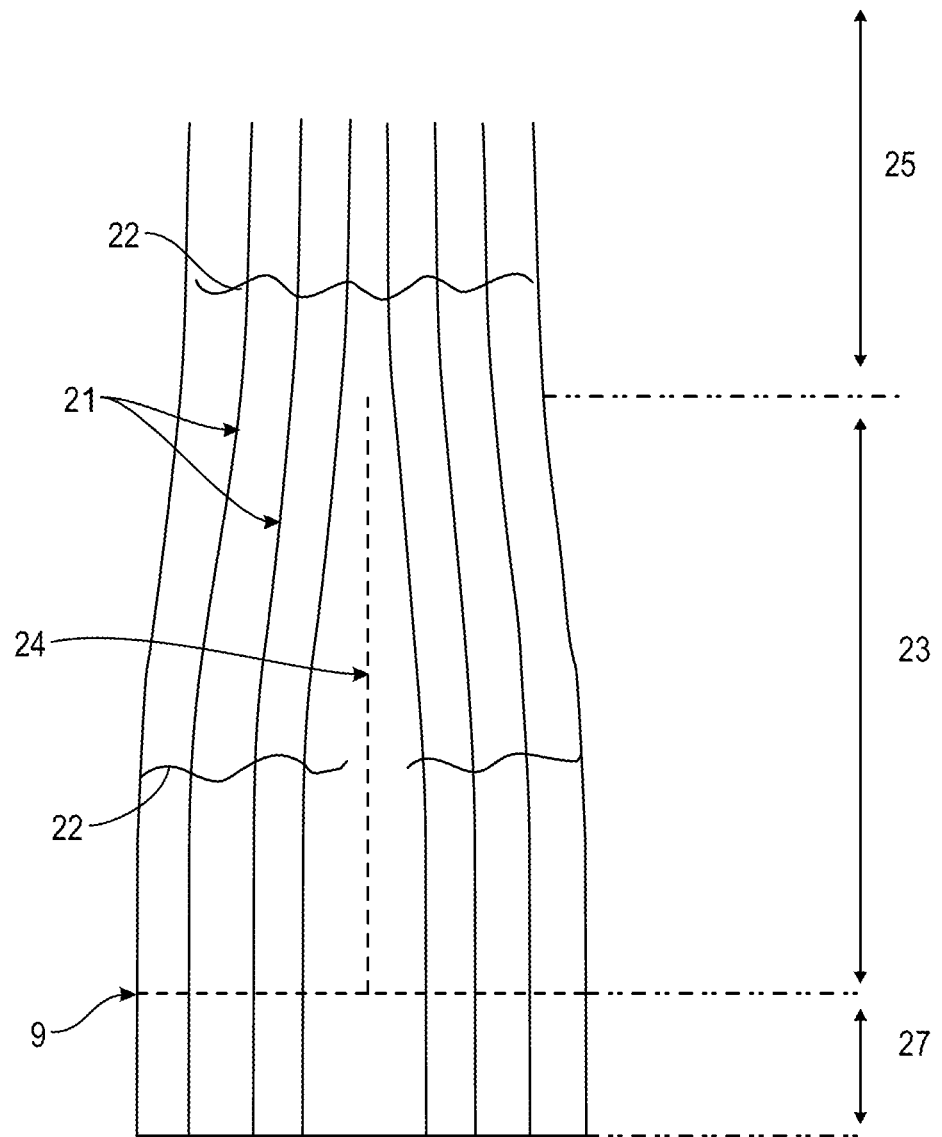
FIG. 7 is a schematic view in the longitudinal direction of the constitution of a preform of the skin of the blade of FIG. 3 during the step of weaving this preform.

With reference to FIG. 7, as previously indicated, this is essentially a conventional weaving with warp strands 21 running in the direction of the span and weft strands 22 running around the profile in a substantially perpendicular direction. The weaving of the preform is realized with carbon fibres on an industrial loom. The linking in the thickness or "interlocking" is performed by making a particular weft strand path 22 between the warp strands 21.

With reference to FIG. 7, the preform of the skin 6 consists of a lower portion 23, starting from the root 9, at the level of which there is an unbinding 24 and an upper portion 25, comprising the head 10, which is monolithic. The unbinding 4 is here a longitudinally extending line, along which the weft strands are stopped, so that the preform can be opened along this line to let the preform of the spar 16 pass.

FIG. 6 shows a possible form of unbinding 24 with a constant skin thickness 6 in the unbound portion and an unbinding at the trailing edge 8. This unbinding 8, which is also shown in the cross-sections of FIGS. 5A and 5B, serves only to open the preform of the skin 6 for insertion of the spar. The shape of the unbinding 24 is chosen so as to guarantee a good insertion of the spar. Furthermore, depending on the strategy in terms of skin thickness in the unbound portion, the shape of the unbinding 24 is more or less extensive.

For these reasons, the unbinding is done at the level of the trailing edge and not, for example, at the leading edge, the woven preform being interwoven or interlocked all along the leading edge 7.

To allow the spar to be inserted, the unbinding 24 covers the area where the latter is integrated.

The lower portion 23, being intended to surround the spar, therefore has a span at least equal to that of the spar 16. The upper portion 25 is monolithic. On the one hand, there is no unbinding of the skin 6, and on the other hand, the thickness of the skin 6 does not allow to leave a gap between the two lateral faces, as this portion is entirely made of a carbon fibre weaving. The dashed line 26 in FIG. 6 shows the boundary, seen from the side, of this portion 25.

With reference to FIG. 7, the weaving strategy consists in starting to weave the raw preform of the skin 6 through the root 9 by integrating all the warp strands 21 necessary to weave the part in a kind of dummy root 27.

Once the preform is woven, trimming of the floats is realized and then a water jet cut to drop the dummy root 27. The result is an unbinding 24 opening at the root 9, ready to receive the assembly of the attachment 11 and the preform of spar 16.

As is the case with a conventional preform, the raw preform, once the dummy root 27 has been dropped, still has excess lengths. There are excess lengths at the level of the head, the leading edge and the trailing edge. On the lower portion of the skin 6, the ability to rework post-injection is limited due to the assembling on the spar and the bell. However, there may be a small over-length which will be taken up except in the immediate vicinity of the root 9.

After the first two steps, a third step consists of performing a shaping of the blade 5 and the injection.

The attachment 11, preform of the spar 16 and foam shape 18 assembly is inserted into the woven preform of the skin 6 at the level of the unbinding 24. A pre-machined foam structure 19 may be used at the interface between the preform of the skin 6 and the preform of the spar 16. The geometry of this interface part 19 can be designed to ensure the centrifugal holding of the skin 6.

The assembly is then injected and polymerised using the RTM method to obtain the blank of the blade 5.

The last step in the manufacturing method is clipping and finishing.

It should be noted that during the polymerisation, flashes of resin may occur on the over-lengths. They are eliminated during the rework, which comprise the clipping of the leading edge 7 and the trailing edge 8, as well as the trimming of the blade head 10.

The step also normally comprises rework at the level of the lower portion of the blade (on the hub line), which must be done precisely because of the assembling with the attachment 11.

Optionally, the method is completed by gluing a leading edge and/or a trailing edge fitted and a protective film to the skin.

The invention claimed is:

1. A composite blade for a turbine engine rotor, the composite blade comprising a skin made of woven fibres forming the external profile of the composite blade and an attachment with cylindrical geometry in the direction of a span emerging from a root of the composite blade, the composite blade extends radially between a head and the root, wherein the attachment is intended to hold the composite blade on a hub of said turbine engine rotor,
   wherein said composite blade further comprises a spar having a hollow tube structure made of braided carbon fibres, the hollow tube structure is fixed to the attachment and extending inside the skin over at least one portion of the span of the composite blade,
   wherein the skin comprises a lower portion and an upper portion, the lower portion starting from the root at the level of which there is an unbinding of the skin, the lower portion surrounding the spar, and the upper portion comprising the head of the composite blade which is a monolithic portion of woven skin without the spar, and
   wherein the head of the composite blade is distant from a tip of the spar.

2. The composite blade according to claim 1, wherein the attachment comprises a bell-shaped portion inserted at one end of the spar.

3. The composite blade according to claim 1, wherein the attachment is made of metallic material.

4. The composite blade according to claim 3, wherein the attachment is made of martensitic steel.

5. The composite blade according to claim 1, wherein a foam shape ensures the interface between the spar and the skin.

6. The composite blade according to claim 1, wherein the interior of the spar is filled with a foam shape.

7. The composite blade according to claim 6, wherein the foam shape is stopped before the tip of the spar.

8. The composite blade according to claim 1, wherein the attachment comprises at least one reinforcement intended to form a ring for a ball rolling.

9. A turbine engine propeller comprising composite blades according to claim 1.

10. A method for manufacturing a blade according to claim 1, comprising the weaving of a preform for the skin, wherein it comprises a step of manufacturing an assembly comprising a braided preform of hollow spar and a cylindrical attachment fixed together, a step of inserting said assembly into the skin preform and a step of forming the blade with its final shape by a resin transfer moulding method, referred to as RTM.

11. The method according to claim 10, wherein the weaving of the preform of the skin is done with a method of interweaving warp strands with weft strands with the creation of an unbinding on a portion of the skin, arranged to insert the assembly comprising the braided spar preform and the attachment.

12. The method according to claim 11, wherein said unbinding takes place at a trailing edge of the skin preform.

13. The method according to claim 10, wherein a foam shape is inserted into the braided preform of the spar, when assembled with the attachment, in order to make it conform to the final shape of the profile of the blade.

14. The composite blade according to claim 1, wherein the composite blade is an un-ducted propeller.

15. The composite blade according to claim 1, wherein the spar extends inside the skin over a distance between 30% and 70% of the span of the composite blade from the root.

16. The composite blade according to claim 1, wherein the hollow tube structure has a circular shape in cross-section at the level of the root and a gradually flattened shape in cross-section to a top of the spar.

17. The composite blade according to claim 1, wherein the unbinding is at only a trailing edge of the composite blade.

18. A composite blade for a turbine engine rotor, the composite blade comprising a skin made of woven fibres forming the external profile of the composite blade and an attachment with cylindrical geometry in the direction of a span emerging from a root of the composite blade, wherein the attachment is intended to hold the composite blade on a hub of said turbine engine rotor,
   wherein said composite blade further comprises a spar having a hollow tube structure made of braided carbon fibres, the hollow tube structure is fixed to the attachment and extending inside the skin over at least one portion of the span of the composite blade,
   wherein the spar extends inside the skin over a distance between 30% and 70% of the span of the composite blade from the root, wherein the attachment comprises a bell-shaped portion inserted at one end of the spar, wherein the composite blade comprises at a head opposite to the root, said head having only a monolithic portion of woven skin and free of spar, wherein the skin comprises a lower portion and an upper portion, the lower portion starting from the root at the level of which there is an unbinding of the skin, the lower portion surrounding the spar, and the upper portion comprising the head of the composite blade which is the monolithic portion of woven skin without the spar, and wherein the head of the composite blade is distant from a tip of the spar.

\* \* \* \* \*